(12) United States Patent
Maria

(10) Patent No.: US 9,949,062 B2
(45) Date of Patent: Apr. 17, 2018

(54) METHOD, COMPUTER-READABLE STORAGE DEVICE AND APPARATUS FOR PREDICTIVE MESSAGING FOR MACHINE-TO-MACHINE SENSORS

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/243,546

(22) Filed: Aug. 22, 2016

(65) Prior Publication Data
US 2017/0034645 A1 Feb. 2, 2017

Related U.S. Application Data

(63) Continuation of application No. 14/084,542, filed on Nov. 19, 2013, now Pat. No. 9,426,602.

(51) Int. Cl.
| | |
|---|---|
| *H04W 4/00* | (2009.01) |
| *H04W 4/12* | (2009.01) |
| *H04W 4/14* | (2009.01) |
| *H04W 24/10* | (2009.01) |
| *G06Q 10/00* | (2012.01) |

(Continued)

(52) U.S. Cl.
CPC ............ *H04W 4/005* (2013.01); *H04W 4/12* (2013.01); *H04W 4/14* (2013.01); *G06Q 10/20* (2013.01); *H04W 4/006* (2013.01); *H04W 24/08* (2013.01); *H04W 24/10* (2013.01); *H04W 84/18* (2013.01)

(58) Field of Classification Search
CPC ..... H04W 4/005; H04W 24/08; H04W 24/10; H04W 4/006; H04W 4/12; H04W 4/14; H04W 84/18; G06Q 10/20
USPC ...................................................... 340/870.5
See application file for complete search history.

(56) References Cited

U.S. PATENT DOCUMENTS

| | | |
|---|---|---|
| 4,710,864 A | 12/1987 | Li |
| 4,910,660 A | 3/1990 | Li |
| 7,533,079 B2 | 5/2009 | Naito et al. |

(Continued)

FOREIGN PATENT DOCUMENTS

| | | |
|---|---|---|
| WO | WO 2004042563 A2 | 5/2004 |
| WO | WO 2010003151 A2 | 1/2010 |

OTHER PUBLICATIONS

Dujak et al, "Machine-to-machine communication as key enabler in smart metering systems" *36th International Convention on Communication Technology Electronics & Microelectronics (MIPRO)*, 2013 May 20-24, 2013 pp. 409-414 Print ISBN: 978-953-233-076-2 INSPEC Accession No. 13768123 http://ieeexplore.ieee.org/xpl/login.jsp?tp&arnumber=6596292 &url=http%3A%2F%2Fieeexplore.ieee.org%2Fxpls%2Fabs_all.jsp%3Farnumber%3D6596292.

(Continued)

*Primary Examiner* — Hirdepal Singh

(57) ABSTRACT

A method, computer-readable storage device and apparatus for generating a predictive message in a communications network are disclosed. For example, the method receives at least one machine-to-machine communication in the communications network, stores the at least one machine-to-machine communication in a database of the communications network, analyzes the at least one machine-to-machine (Continued)

communication, and generates the predictive message based upon the at least one machine-to-machine communication that is analyzed.

20 Claims, 3 Drawing Sheets

(51) Int. Cl.
*H04W 24/08* (2009.01)
*H04W 84/18* (2009.01)

(56) References Cited

U.S. PATENT DOCUMENTS

| | | | |
|---|---|---|---|
| 8,050,939 B2 | 11/2011 | Graves et al. | |
| 8,054,177 B2 | 11/2011 | Graves et al. | |
| 8,170,965 B2 | 5/2012 | Mihelic | |
| 8,509,935 B2 | 8/2013 | Hoyte et al. | |
| 8,856,584 B2* | 10/2014 | Matsubara | H04L 45/22 370/217 |
| 9,270,492 B2* | 2/2016 | Ansari | G06Q 30/04 |
| 9,641,958 B2* | 5/2017 | Lehane | H04W 4/005 |
| 9,774,522 B2* | 9/2017 | Vasseur | H04L 45/28 |
| 2002/0091972 A1 | 7/2002 | Harris et al. | |
| 2003/0064712 A1 | 4/2003 | Gaston et al. | |
| 2005/0251397 A1 | 11/2005 | Zanovitch et al. | |
| 2006/0167917 A1 | 7/2006 | Solomon | |
| 2009/0037206 A1 | 2/2009 | Byrne et al. | |
| 2013/0150091 A1 | 6/2013 | Ingram et al. | |
| 2013/0197830 A1 | 8/2013 | Dvorak et al. | |
| 2013/0262349 A1 | 10/2013 | Bouqata et al. | |
| 2014/0077968 A1* | 3/2014 | Alberth, Jr. | G07F 15/10 340/870.02 |
| 2014/0228061 A1* | 8/2014 | Draznin | H04W 4/12 455/466 |
| 2015/0289123 A1* | 10/2015 | Shatzkamer | H04W 4/26 455/406 |

OTHER PUBLICATIONS

Persson et al, "A Multi-agent Organization for the Governance of Machine-to-Machine Systems" *International Conference on Web Intelligence and Intelligent Agent Technology (WI-IAT)*, 2011 IEEE/WIC/ACM (vol. 2 ) Date of Conference: Aug. 22-27, 2011 pp. 421-424 E-ISBN : 978-0-7695-4513-4 Print ISBN: 978-1-4577-1373-6 INSPEC Accession No. 12302111 Conference Location : Lyon, Digital Object Identifier : 10.1109/WI-IAT.2011.161 http://ieeexplore.ieee.org/xpl/articleDetails.jsp?tp=&arnumber=6040668 &searchWithin%3D.QT.machine+to+machine.QT.+OR+machine-tomachine%26matchBoolean%3Dtrue%26rowsPerPage%3D50% 26searchField%3DSearch_All%26queryText%3D%28%28M2M+autonomous.

Mingozzi et al, "An open framework for accessing Things as a service" *International Symposium on Wireless Personal Multimedia Communications (WPMC)*, 2013 16th Date of Conference: Jun. 24-27, 2013 pp. 1-5 ISSN : 1347-6890, INSPEC Accession No. 13825344 http://ieeexplore.ieee.org/xpl/articleDetails.jsp?tp= &arnumber=6618643&searchWithin%3D.QT. machine+to+machine.QT.+OR+machine-tomachine%26matchBoolean%3Dtrue%26rowsPerPage%3D50%2 6searchField%3DSearch_All%26queryText%3D%28%28M2M+autonomous.

WIPRO, "Machine to Machine—The Technology of the Future" WIPRO Technologies, Doddakannelli, Bangalore, India http://www.wipro.com/Documents/resource-center/Machine_to_machine.pdf.

OECD, "Smart Sensor Networks: Technologies and Applications for Green Growth" Organisation for Economic Cooperation and Development Dec. 2009 http://www.oecd.org/sti/44379113.pdf.

Thawani, Amit, et al. "Context-aware timely information delivery in mobile environments." *The Computer Journal* 50.4 (2007): 460-472. http://citeseerx.ist.psu.edu/viewdoc/download?doi=10.1.1. 116.206&rep=rep1&type=pdf.

* cited by examiner ation Ser. No. 14/084,542, filed Nov. 19, 2013, now U.S. Pat.
METHOD, COMPUTER-READABLE STORAGE DEVICE AND APPARATUS FOR PREDICTIVE MESSAGING FOR MACHINE-TO-MACHINE SENSORS This application is a continuation of U.S. patent application Ser. No. 14/084,542, filed Nov. 19, 2013, now U.S. Pat. No. 9,426,602, which is herein incorporated by reference in its entirety.

BACKGROUND

Machine to machine (M2M) communications provide huge growth opportunities for communications network service providers, e.g., both cellular network operators and mobile service providers. At the same time, M2M communications also present some challenges to the mobile network.

Currently, millions of M2M communications may pass across a communications network. However, the communications network does not capture or analyze any of the M2M communications. Rather, the communications network simply passes the M2M communications along the network to a destination. In addition to the high volume of M2M communications, these millions of M2M communications that are sent daily may be cumbersome for the recipients to process and store.

SUMMARY

In one embodiment, the present disclosure provides a method, computer-readable storage device and apparatus for generating a predictive message in a communications network. In one embodiment, the method receives at least one machine-to-machine communication in the communications network, stores the at least one machine-to-machine communication in a database of the communications network, analyzes the at least one machine-to-machine communication, and generates the predictive message based upon the at least one machine-to-machine communication that is analyzed.

BRIEF DESCRIPTION OF THE DRAWINGS

The essence of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, computer-readable storage device and apparatus for generating a predictive message based upon a machine-to-machine communication in a communications network. Machine to machine (M2M) communications provide huge growth opportunities for communications network service providers such as, for example, cellular and mobile service providers.

Currently, millions of M2M communications may pass across a communications network. For example, M2M communications may be generated by sensor devices that are used to automatically measure various parameters such as power consumption, a temperature, an inventory level, a chemical level, a detected error, and the like. These sensors may take measurements continuously, e.g., over the course of an hour, a day, a week and a month. As a result, millions of messages may be generated that are sent across the communications network.

However, the communications network does not capture or analyze any of the M2M communications. Rather, the communications network simply passes the M2M communications along the network to a destination. In addition, the millions of M2M communications that are sent daily can be cumbersome for the recipients to process and store. Thus, one embodiment of the present disclosure stores and analyzes the M2M communications within the communications network to remove the burden and costs associated with storing and analyzing the M2M communications from the third party enterprise subscriber or customer.

Figure 1:
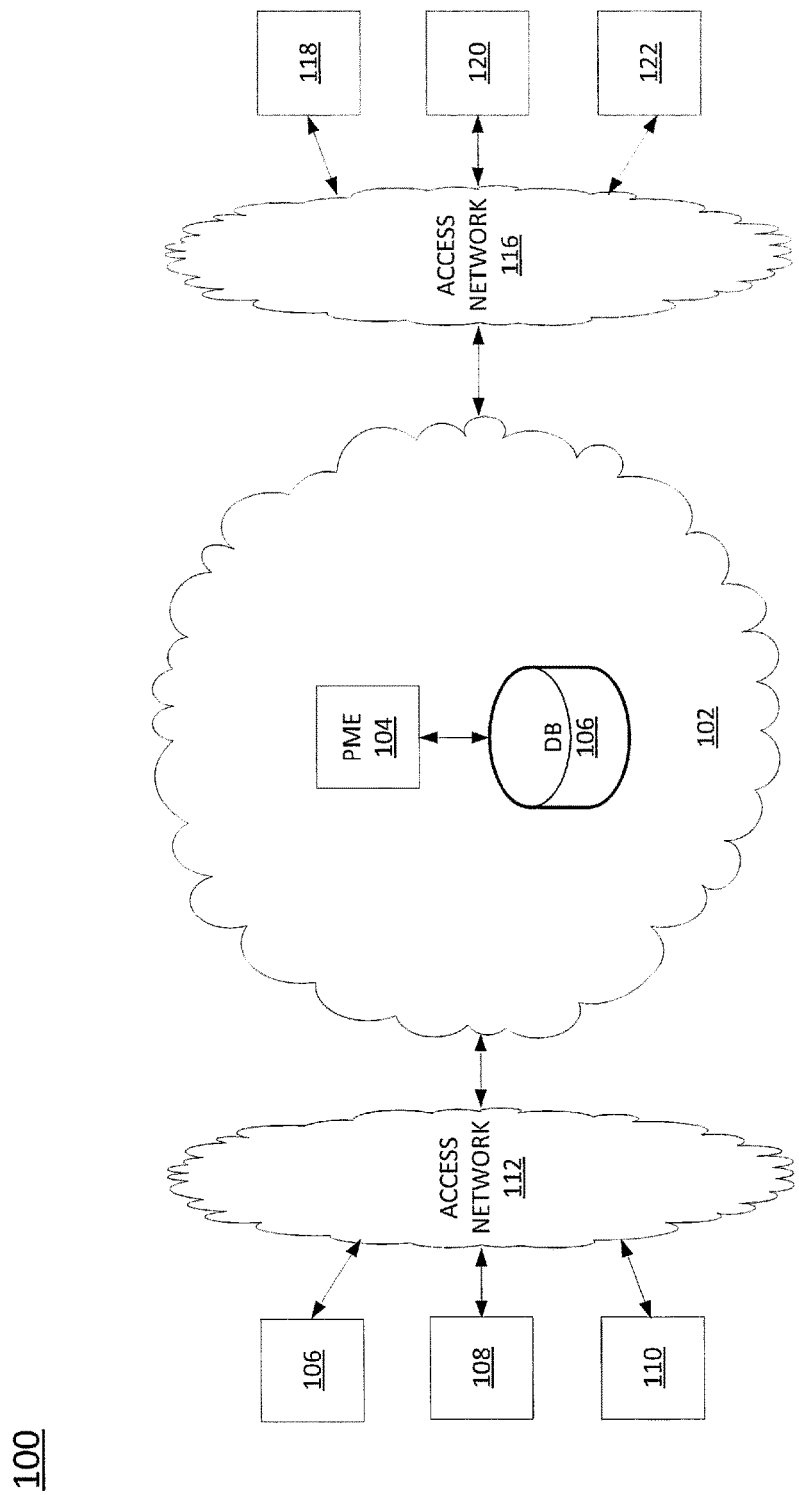
FIG. 1 illustrates one example of a communications network of the present disclosure.

FIG. 1 is a block diagram depicting one example of a communications network 100. For example, the communication network 100 may be any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and the like related to the current disclosure. It should be noted that an IP network is broadly defined as a network that uses Internet Protocol to exchange data packets.

In one embodiment, the communications network 100 may include a core network 102. The core network 102 may include a predictive messaging engine (PME) 104. The PME 104 may be deployed as a separate hardware device embodied as a general purpose computer (e.g., the general purpose computer 300 illustrated in FIG. 3) or an application server. In another embodiment, the PME 104 may be deployed as part of another network element in the core network 102, such as for example, a border element, a gateway, a firewall, a call control element, a router, a switch, and the like.

The core network 102 may also include a database (DB) 106 in communication with the PME 104. The DB 106 may store all of the M2M communications received by the PME 104. The PME 104 may access the DB 106 at any time to retrieve M2M communications for analysis to generate the predictive messages.

In one embodiment, the network 100 may comprise one or more machines 106, 108 and 110, one or more access networks 112 and 116 of the same operator or different operators (e.g., a wired and a wireless access) and one or more third party enterprise subscribers 118, 120 and 122. In one embodiment, the machines 106, 108 and 110 may be any type of hardware machine capable of communicating over the network communications network 100. For example, the machines 106, 108 and 110 may be any type of smart hardware devices, e.g., an appliance such a refrigerator, a set top box, a modem, a terminal adaptor, and a sensor with a communication module (e.g., a temperature sensor, a motion sensor, a pressure sensor, a camera sensor, a proximity sensor, a speed sensor, a humidity sensor, a light sensor, an acceleration sensor, a current sensor, a biosensor, a flow sensor and the like). However, a "machine" as defined herein, does not consider a general purpose computing device such as a desktop computer or laptop computer that has a display and input/output devices such as a keyboard, a disk drive, and the like to be a "machine" within the scope of the present disclosure.

It should be noted that although only three machines are illustrated in FIG. 1, any number of hardware machines may be deployed. In addition, the machines 106, 108 and 110 may be located remotely from one another or near one another.

In one embodiment, the access networks 112 and 116 may be any type of access network such as a cellular network, a wireless network, a wireless-fidelity (Wi-Fi) network, a PSTN network, an IP network and the like. The access networks 112 and 116 may be operated by the same operator or by different operators. The access networks 112 and 116 and the core network 102 may include additional network elements that are not disclosed. For example, the access networks 112 and 116 and the core network 102 may also include border elements, gateways, firewalls, routers, switches, call control elements, various application servers (not shown) and the like.

In one embodiment, the third party enterprise subscribers 118, 120 and 122 may be various enterprise customers that subscribe to a service for generating a predictive message based upon the M2M communications. For example, the third party enterprise subscribers 118, 120 and 122 may each pay a fee for subscribing to the service.

It should be noted that although three third party enterprise subscribers are illustrated in FIG. 1, any number of third party enterprise subscribers may subscribe to the service for generating predictive messages. In one embodiment, the third party enterprise subscribers 118, 120 and 122 may be located remotely from one another or located near one another.

In one embodiment, the machines 106, 108 and 110 may belong to the third party enterprise subscribers 118, 120 and 122, respectively. In addition, the third party enterprise subscribers 118, 120 and 122 may have customers that are using the machines 106, 108 and 110. For example, the machine 106 may be a sensor that measures electricity usage in kilowatts for a home owner that is a customer of a power company (a third party enterprise subscriber). In turn, the power company may subscribe to a service for generating predictive messages from the service provider or operator of the communications network 100. In another embodiment, the machine 108 may be a sensor that measures a chlorine level in a pool of a home owner that is a customer of a pool servicing company (a third party enterprise subscriber). Again, the pool servicing company may subscribe to a service for generating predictive messages from the service provider of the communications network 100.

In one embodiment, a third party enterprise subscriber (e.g., 118) may subscribe to a service for generating predictive messages. For example, the sensor 106 may belong to the third party enterprise subscriber 118. The sensor 106 may be deployed to measure electricity usage.

The service provider of the communications network 100 may provide a question and answer session over an interface (e.g., a web interface, an application on a client, an interactive voice response menu, and the like) with the third party enterprise subscriber 118. The question and answer session is used to allow a third party enterprise subscriber to provide necessary information to identify which sensors belong to the third party enterprise subscriber 118, one or more parameters relating to permission to directly send messages to the customers of the third party enterprise subscriber 118, one or more parameters that would trigger generating a predictive message, one or more parameters for predicting events based upon the M2M communications, and the like.

In one embodiment, the parameters may include a threshold that would indicate some servicing is required. For example, if a current sensor measures kilowatts of electricity being below a threshold, the customer of the third party enterprise subscriber (e.g., a power company) may be experiencing a power outage or issue with electricity in the customer's home. In another example, if a chemical sensor measures a chlorine level in a pool is below a threshold, the customer of the third party enterprise subscriber (e.g., a pool servicing company) may need to service the pool to re-establish the proper chlorine level.

In one embodiment, once the parameters of each third party enterprise subscriber 118, 120 and 122 are stored and catalogued in the DB 106, the PME 104 may receive and store M2M communications from the respective sensors 106, 108 or 110. In one embodiment, the M2M communications may be sent as text messages, e.g., a short message service (SMS) message or a multi-media messaging service (MMS) message. In one embodiment, the M2M communications may include data related to a parameter that the sensor is assigned to measure or monitor, identification of the sensor, a third party enterprise subscriber that owns the sensor, a time stamp, a location of the sensor, and the like.

In one embodiment, PME 104 stores the received M2M communications in the DB 106. In other words, M2M communications generated by the sensors 106, 108 and 110 would not be sent over the communications network 100 to a respective one of the third party enterprise subscribers 118, 120 and 122. As discussed above, the communications networks in the past would perform no analysis on the M2M communications. In contrast, one embodiment of the present disclosure intercepts the M2M communications destined for third party enterprise subscribers 118, 120 and 122 such that the M2M communications do not reach the third party enterprise subscribers 118, 120 and 122. Rather, the M2M communications are stored in the DB 106.

The PME 104 may then perform an analysis on the M2M communications that are stored in the DB 106. In one embodiment, the PME 104 analyzes the M2M communications as the PME 104 receives the M2M communications.

In one embodiment, the PME 104 applies the parameters or algorithms specified by the respective third party enterprise customer 118, 120 or 122 to determine if a predictive message should be generated. The predictive message comprises a message that indicates the potential occurrence of a future event based on the analysis of the M2M communications. For example, the third party enterprise subscriber 118 may specify that a regression analysis should be used to determine if the chlorine level will potentially fall below a predefined threshold. The PME 104 may then analyze the M2M communications received from the sensor 106 that is tasked with measuring the chlorine level in a pool of a customer of the third party enterprise subscriber 118. The PME 104 may apply the regression analysis and detect that the chlorine level will potentially fall below the threshold at the current rate within the next day. In other words, the analysis of the communications from the sensor 106 is analyzed by the PME 104 on behalf of the third party enterprise subscriber 118. Thus, the communications from the sensor 106 is not sent to the third party enterprise subscriber 118.

In one embodiment, the PME 104 may perform the analysis continuously. In another embodiment, the PME 104 may perform the analysis periodically, e.g., within a predefined time period such as every hour, every day, every week and so on. In another embodiment, the PME 104 may perform the analysis along a sliding window of a fixed duration.

In one embodiment, the price paid by the third party enterprise subscribers 118, 120 and 122 may vary depending on the amount and frequency of analysis that is desired. For example, a continuous analysis by the PME 104 may have the highest subscription fee, a sliding window analysis may have a medium subscription fee and a periodic analysis may have a lowest subscription fee.

In response to the analysis example of the chlorine level of a pool discussed above, the PME 104 may generate a predictive message indicating that the chlorine level of the pool will potentially be below the threshold within some time period, e.g., the chlorine level will fall below acceptable level within three (3) days. In one embodiment, the predictive message is sent to the third party enterprise subscriber 118 to indicating that the pool of the identified customer should be serviced, e.g., within three (3) days.

In another embodiment, if the third party enterprise subscriber 118 provided permission to contact the customer directly, the PME 104 may generate a predictive message and send the predictive message directly to the customer of the third party enterprise subscriber 118. The predictive message may also include a corrective action, e.g., an instruction to the customer to add two chlorine tablets immediately. As a result, the third party enterprise subscriber 118 will not need to expend resources to address the issue or process a future customer service call. This approach allows each third party enterprise subscriber to outsource the task of analyzing large numbers of M2M communications from numerous sensors that are deployed in wide geographic areas. Instead, the third party enterprise subscriber simply subscribes to a service and allows the network service provider of the core network 102 to bear the computational cost and responsibility of having to process the large volume of M2M communications. The third party enterprise subscriber simply needs to define the analysis method and the associated parameters to be used by the network service provider of the core network 102.

In one embodiment, the predictive message is sent as an SMS message, an MMS message, an email, an automated telephone call, and the like. In one embodiment, the predictive message may be sent to an automated system in communication with the sensor 106. For example, the automated system may take the necessary corrective action based upon the predictive message received from the PME 104. For example, the automated system may be coupled to the pool to provide fluid filtering functions including the ability to apply chlorine tablets, and the like. In another example, the automated system may be coupled to a thermostat, a control switch, a locking/unlocking mechanism, an environmental control system (e.g., Heating, Ventilation, and Air-Conditioning (HVAC) system) and the like.

In one embodiment, the PME 104 may analyze the M2M communications and send one or more predictive messages to different third party enterprise customers. For example, sensors 106 and 108 may be located along a west to east direction in neighboring towns and belong to different third party enterprise customers 118 and 120, respectively (e.g., different utility companies). The sensor 106 may send M2M communications indicating that the measured electricity is zero for sensor 106 and then subsequently a few hours later, sensor 108 also send M2M communications indicating that the measured electricity is zero. The PME 104 may predict that a storm or some event is moving from the west to the east along a line. The third party enterprise subscriber 122 may be located along the predicted line from west to east. The PME 104 may then send a predictive message to each of the third party enterprise subscribers 118 and 120 that additional customers may experience power outage due to the fact that some of their customers are currently experiencing power outages.

In addition, the PME 104 may send a predictive message to the third party enterprise subscriber 122 that a storm or a power interrupting event is heading in a direction that will impact the customers of third party enterprise subscriber 122 and that action should be taken to proactively service the customer associated with the sensor 110. In other words, since the network service provider operating the PME 104 is able to determine this pattern of outages, the PME 104 is able to warn third party enterprise subscriber 122 even before any customers of third party enterprise subscriber 122 experience any outages. Namely, the sensor 110 of the third party enterprise subscriber 122 did not provide any M2M communications that would trigger a predictive message to be sent to the third party enterprise subscriber 122. Rather, the third party enterprise subscriber 122 received the predictive message based upon a trend or pattern identified by the analysis of other M2M communications received by the PME 104.

In one embodiment, the third party enterprise subscribers 118, 120 and 122 may have access to their respective M2M communications stored in the PME 104. For example, the third party enterprise subscribers 118, 120 and 122 may want to access the M2M communications to perform a more detailed or different analysis at a later time, refine and adjust their respective parameters or analysis methods based upon the M2M communications, and the like. Thus, although the M2M communications are not sent to the respective third party enterprise subscribers 118, 120 and 122 when the M2M communications are generated by the sensors, the stored M2M communications can be accessed by the respective third party enterprise subscribers 118, 120 and 122 at a later time.

Thus, as illustrated above, embodiments of the present disclosure transfer the cost and burden of analyzing M2M communications from the third party enterprise subscribers 118, 120 and 122 to the service provider of the communications network 100. In additions, third party enterprise subscribers 118, 120 and 122 will save costs and improve efficiency by using the storage and processing resources of the communications network 100 rather than having to separately purchase and deploy the required storage and processing resources.

Figure 2:
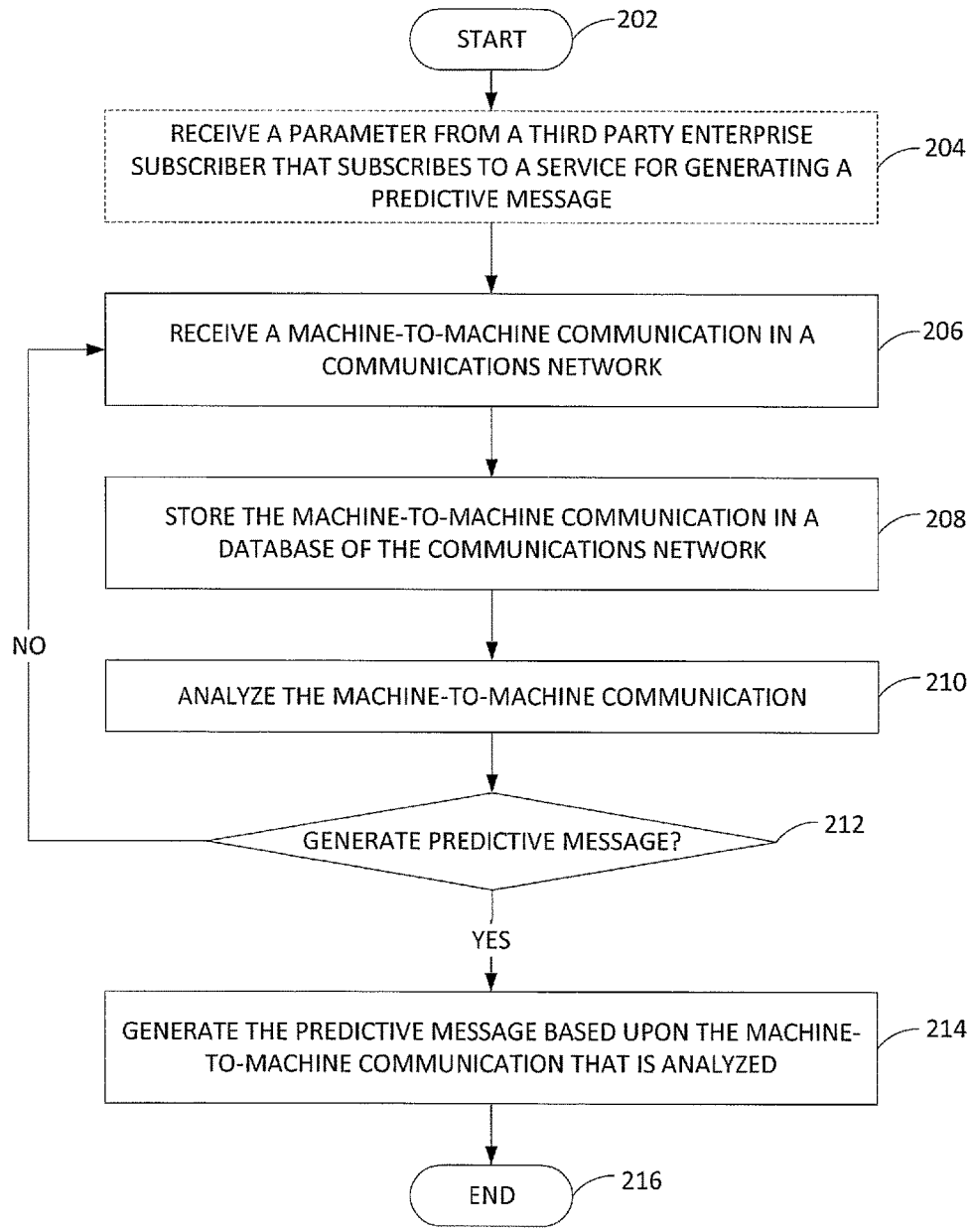
FIG. 2 illustrates an example flowchart of a method for generating a predictive message based upon machine to machine communications in a communications network.
Figure 3:
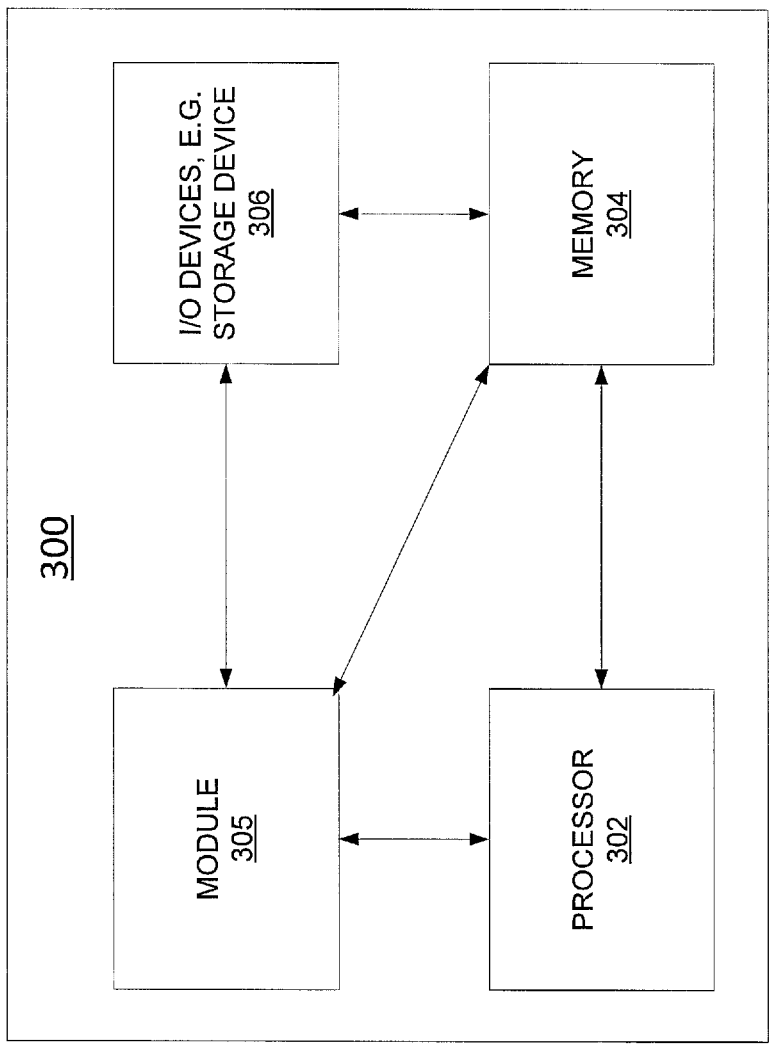
FIG. 3 illustrates a high-level block diagram of a general-purpose computer suitable for use in performing the functions described herein.

FIG. 2 illustrates a flowchart of a method 200 for generating a predictive message based upon a machine-to-machine communication in a communications network. In one embodiment, the method 200 may be performed by an application server, e.g., the PME server 104 or a general purpose computer as illustrated in FIG. 3 and discussed below.

The method 200 starts at step 202. At optional step 204, the method 200 may receive a parameter from a third party enterprise subscriber that subscribes to a service for generating a predictive message. For example, the third party enterprise subscriber may use a web interface to complete a question and answer form to provide the necessary information (method and associated parameters) as to when a predictive message should be generated. In one embodiment, the information of each third party enterprise subscriber is stored and catalogued in a database in the communications network.

For example, the question and answer session is used to identify which sensors belong to the third party enterprise subscriber, permission to directly send messages to the customers of the third party enterprise subscriber, one or more parameters of a predictive method (e.g., an algorithm for predicting one or more events based upon the M2M communications) that would trigger generating a predictive message, and the like.

In one embodiment, the parameters may include a threshold that would indicate some servicing is required. For example, if a sensor measures kilowatts of electricity below a threshold, the customer of the third party enterprise subscriber (e.g., a power or utility company) may be experiencing a power outage or having an issue with electricity in the customer's home. In another example, if a sensor measures a chlorine level in a pool is below a threshold, the customer of the third party enterprise subscriber (e.g., a pool servicing company) may need to service the pool to re-establish the proper chlorine level.

At step 206, the method 200 receives an M2M communication in a communications network. In one embodiment, the M2M communications may be sent as a short message service (SMS) message or a multi-media messaging service (MMS) message.

In one embodiment the M2M communication is received from a sensor associated with a third party enterprise subscriber. For example, the M2M communications may include data related to a parameter that the sensor is assigned to measure or monitor, identification of the sensor, a third party enterprise subscriber that owns the sensor, a time stamp, a location of the sensor, and the like.

At step 208, the method 200 stores the M2M communication in a database of the communications network. After the M2M communication is stored, a PME may fetch the required M2M communications to be analyzed, e.g., at a later time.

At step 210, the method 200 analyzes the M2M communications. In one embodiment, the method 200 may analyze a plurality of M2M communications, e.g., over a period of time. In one embodiment, the analyzing may include comparing data contained in the M2M communications with a parameter from the third party enterprise subscriber to determine whether a threshold will be breached. For example, the PME may use an algorithm specified by the third party enterprise subscriber (e.g., a regression analysis) and predicts that a threshold for a particular parameter that is being measured will be breached in the future.

In another embodiment, the M2M communications are analyzed to generate and send one or more predictive messages to different third party enterprise customers. For example, sensors may be located along a west to east direction in neighboring towns and belong to different third party enterprise customers. The sensors may send M2M communications indicating that the measured electricity is zero for a first sensor and then subsequently a few hours later the measured electricity is zero for a second sensor. The PME may predict that a storm, a solar flare or some power interrupting event is moving from west to east along a line. A different third party enterprise subscriber other than the third party enterprise subscribers associated with the first two sensors may be located along the predicted line from west to east. Thus, the method 200 may determine that a predictive message should be generated for the different third party enterprise subscriber.

In one embodiment, the PME 104 may perform the analysis continuously. In another embodiment, the PME 104 may perform the analysis periodically. In another embodiment, the PME 104 may perform the analysis along a sliding window of a fixed duration. In one embodiment, the price paid by the third party enterprise subscribers 118, 120 and 122 may vary depending on the amount and frequency of analysis desired. For example, a continuous analysis by the PME 104 may have the highest subscription fee, a sliding window analysis may have medium subscription fee and a periodic analysis may have a lowest subscription fee.

At step 212, the method 200 determines whether a predictive message should be generated. For example, if the analysis performed in step 210 determines that no predictive message needs to be generated because there is no potential for a threshold to be breached or no predictable trend can be identified, then the method 200 may return to step 206 and continue receiving, storing and analyzing M2M communications as discussed for steps 206, 208 and 210. However, if the method 200 determines that a predictive message should be generated at step 212, the method 200 proceeds to step 214.

At step 214, the method 200 generates the predictive message based upon the M2M communications that are analyzed. For example, if the analysis in step 210 determines that a chlorine level of a pool of a customer of the third party enterprise subscriber will potentially be below a threshold within three days, then a predictive message is sent to the third party enterprise subscriber simply indicating that the pool of the identified customer needs servicing within three days.

In another embodiment, if the third party enterprise subscriber provided permission to contact the customer directly, the method 200 may generate a predictive message and send the predictive message to the customer of the third party enterprise subscriber directly. The predictive message may also include a corrective action, e.g., an instruction to the customer to add two chlorine tablets immediately. As a result, the third party enterprise subscriber may not need to expend resources to address the issue or process a future customer service call.

It should be noted that the predictive message is not simply the M2M communication that is received from the sensor. In other words, the predictive message is not simply a reporting of the M2M communication itself. The predictive message comprises a message that indicates the potential occurrence of a future event based on the analysis of the M2M communications. Thus, the predictive message indicating that there is no power at a particular location would not be sent by the PME 104 when a sensor for that particular location is already reporting that there is no power. Since the sensor is already reporting that there is a power outage, there is no need to send a predictive message that "predicts" a power outage at that particular location. However, a predict message can be sent to indicate that a likely power outage may occur for another location that has yet to detect a power outage.

As discussed in the above example, the method 200 may determine that a predictive message should be sent to a different third party subscriber based upon a trend identified in the analysis of a plurality of different M2M communications. For example, the method 200 may send a predictive message to the different third party enterprise subscriber that a storm or a disruptive event is heading in the different third party enterprise subscriber's direction based upon the identified trend in step 210 and that action should be preemptively taken to service the customer associated with a sensor of the different third party enterprise subscriber.

In other words, the sensor of the different third party enterprise subscriber did not provide any M2M communications that would trigger a predictive message to be sent to the different third party enterprise subscriber. Rather, the different third party enterprise subscriber received the predictive message based upon a trend identified by the analysis of other M2M communications received by the PME of other third party enterprise subscribers. The method 200 ends at step 216.

It should be noted that although not explicitly specified, one or more steps or operations of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps, operations or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for generating a predictive message based upon a machine-to-machine communication in a communications network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for generating a predictive message based upon a machine-to-machine communication in a communications network (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for generating a predictive message based upon a machine-to-machine communication in a communications network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
subscribing, by a processor of a third party enterprise subscriber, to a service for receiving a predictive message from a communications network of a telecommunications network service provider, wherein the predictive message is generated based upon at least one machine-to-machine communication that is analyzed by the telecommunications network service provider, the at least one machine-to-machine communication being received from a location of a customer of the third party enterprise subscriber; and
receiving, by the processor, the predictive message without receiving the at least one machine-to-machine communication.

2. The method of claim 1, wherein the at least one machine-to-machine communication comprises a plurality of machine-to-machine communications.

3. The method of claim 1, wherein the at least one machine-to-machine communication comprises a short message service message.

4. The method of claim 1, wherein the at least one machine-to-machine communication is received from a sensor.

5. The method of claim 4, wherein the at least one machine-to-machine communication comprises data associated with a parameter that the sensor measures.

6. The method of claim 1, further comprising:
sending, by the processor, a parameter for receiving the predictive message.

7. The method of claim 6, wherein the telecommunications network service provider compares data contained in the at least one machine-to-machine communication with the parameter to determine whether a threshold will be reached.

8. The method of claim 7, wherein the predictive message that is received indicates that the threshold will be reached.

9. The method of claim 7, wherein the predictive message that is received indicates that the threshold will be reached with an instruction for an action to be taken.

10. A non-transitory computer-readable storage device storing a plurality of instructions which, when executed by a processor of a third party enterprise subscriber, cause the processor to perform operations for generating a predictive message in a communications network, the operations comprising:
subscribing to a service for receiving a predictive message from a communications network of a telecommunications network service provider, wherein the predictive message is generated based upon at least one machine-to-machine communication that is analyzed by the telecommunications network service provider, the at least one machine-to-machine communication being received from a location of a customer of the third party enterprise subscriber; and
receiving the predictive message without receiving the at least one machine-to-machine communication.

11. The non-transitory computer-readable storage device of claim 10, wherein the at least one machine-to-machine communication comprises a plurality of machine-to-machine communications.

12. The non-transitory computer-readable storage device of claim 10, wherein the at least one machine-to-machine communication comprises a short message service message.

13. The non-transitory computer-readable storage device of claim 10, wherein the at least one machine-to-machine communication is received from a sensor.

14. The non-transitory computer-readable storage device of claim 13, wherein the at least one machine-to-machine communication comprises data associated with a parameter that the sensor measures.

15. The non-transitory computer-readable storage device of claim 10, the operations further comprising:
sending a parameter for receiving the predictive message.

16. The non-transitory computer-readable storage device of claim 15, wherein the telecommunications network service provider compares data contained in the at least one machine-to-machine communication with the parameter to determine whether a threshold will be reached.

17. The non-transitory computer-readable storage device of claim 16, wherein the predictive message that is received indicates that the threshold will be reached.

18. The non-transitory computer-readable storage device of claim 16, wherein the predictive message that is received indicates that the threshold will be reached with an instruction for an action to be taken.

19. An apparatus comprising:
a processor of a third party enterprise subscriber; and
a computer-readable storage device storing a plurality of instructions which, when executed by the processor, cause the processor to perform operations, the operations comprising:
subscribing to a service for receiving a predictive message from a communications network of a telecommunications network service provider, wherein the predictive message is generated based upon at least one machine-to-machine communication that is analyzed by the telecommunications network service provider, the at least one machine-to-machine communication being received from a location of a customer of the third party enterprise subscriber; and
receiving the predictive message without receiving the at least one machine-to-machine communication.

20. The apparatus of claim 19, wherein the at least one machine-to-machine communication is received from a sensor.

* * * * *